United States Patent [19]

McDowell

[11] Patent Number: 4,636,232
[45] Date of Patent: Jan. 13, 1987

[54] FILTER STACK

[75] Inventor: David E. McDowell, Grand Rapids, Mich.

[73] Assignee: Amway Corporation, Ada, Mich.

[21] Appl. No.: 809,409

[22] Filed: Dec. 16, 1985

[51] Int. Cl.[4] ............................................. B01D 46/12
[52] U.S. Cl. ........................................ 55/350; 55/484;
55/501; 55/502; 55/503; 55/511; 55/DIG. 31
[58] Field of Search ................. 55/350, 482, 483, 484,
55/501, 502, 503, 511, 521, DIG. 31; 210/323.1;
206/497, 511

[56] References Cited

U.S. PATENT DOCUMENTS

| | | | |
|---|---|---|---|
| 296,758 | 4/1884 | Kutsche | 55/511 X |
| 711,188 | 10/1902 | Stone . | |
| 930,561 | 8/1909 | Rahe . | |
| 994,282 | 6/1911 | Spilsbury . | |
| 1,049,789 | 1/1913 | Williamson . | |
| 1,818,736 | 8/1931 | Moore . | |
| 2,016,033 | 10/1935 | Christofferson . | |
| 2,130,806 | 9/1938 | Link . | |
| 2,143,270 | 1/1939 | Huber | 210/323.1 |
| 2,499,949 | 3/1950 | Glanzer et al. | 55/484 |
| 2,884,091 | 4/1959 | Baldwin . | |
| 3,151,962 | 10/1964 | O'Dell | 55/350 |
| 3,186,149 | 6/1965 | Ayers | 55/484 X |
| 3,215,266 | 11/1965 | Dreyfus | 206/497 |
| 3,242,656 | 3/1966 | Murphy, Jr. . | |
| 3,402,531 | 9/1968 | Farr | 55/350 |
| 3,487,625 | 1/1970 | Lucas | 55/483 |
| 3,490,211 | 1/1970 | Cartier . | |
| 3,579,441 | 5/1971 | Brown . | |
| 3,610,412 | 10/1971 | Morse et al. | 206/497 |
| 3,655,060 | 4/1972 | Hagdahl . | |
| 3,691,736 | 9/1972 | Neumann . | |
| 3,757,499 | 9/1973 | Scott | 55/521 X |
| 3,771,661 | 11/1973 | Barnebey . | |
| 3,812,370 | 5/1974 | LaViolette . | |
| 3,854,904 | 12/1974 | Jamet . | |
| 3,873,287 | 3/1975 | Barnebey . | |
| 3,933,452 | 1/1976 | Rudin . | |
| 3,957,469 | 5/1976 | Nebash | 55/501 X |
| 3,961,924 | 6/1976 | Alskog . | |
| 3,969,095 | 7/1976 | Kurahashi . | |
| 4,133,659 | 1/1979 | Beckman . | |
| 4,133,660 | 1/1979 | Steiner . | |
| 4,193,780 | 3/1980 | Cotton, Jr. et al. . | |
| 4,227,953 | 10/1980 | Wasielewski et al. | 55/502 X |
| 4,324,572 | 4/1982 | Erdmannsdorfer et al. . | |
| 4,350,504 | 9/1982 | Diachuk . | |
| 4,390,354 | 6/1983 | Witchell . | |
| 4,422,861 | 12/1983 | Dusza | 55/502 X |

FOREIGN PATENT DOCUMENTS

| | | | |
|---|---|---|---|
| 78746 | 1/1971 | Fed. Rep. of Germany ... | 210/323.1 |
| 45504 | of 1930 | France | 55/484 |
| 1453653 | 8/1966 | France | 55/484 |
| 2335241 | 8/1977 | France | 55/482 |
| 302527 | 1/1955 | Switzerland | 55/501 |

Primary Examiner—Kathleen J. Prunner
Attorney, Agent, or Firm—Price, Heneveld, Huizenga & Cooper

[57] ABSTRACT

The specification discloses a filter stack in which a plurality of individual tapered frames with openings on their widest sides are alternatively aligned, with filter paper between adjacent frames, such that the openings in one frame face one way and those in the next adjacent frame face the other way. Parallel tongues projecting from one surface of the frames insure that filter paper will be clamped in place. Air leaks are eliminated by shrink-wrapping said stack of frames, except on the ends with openings, to firmly hold them together.

25 Claims, 7 Drawing Figures

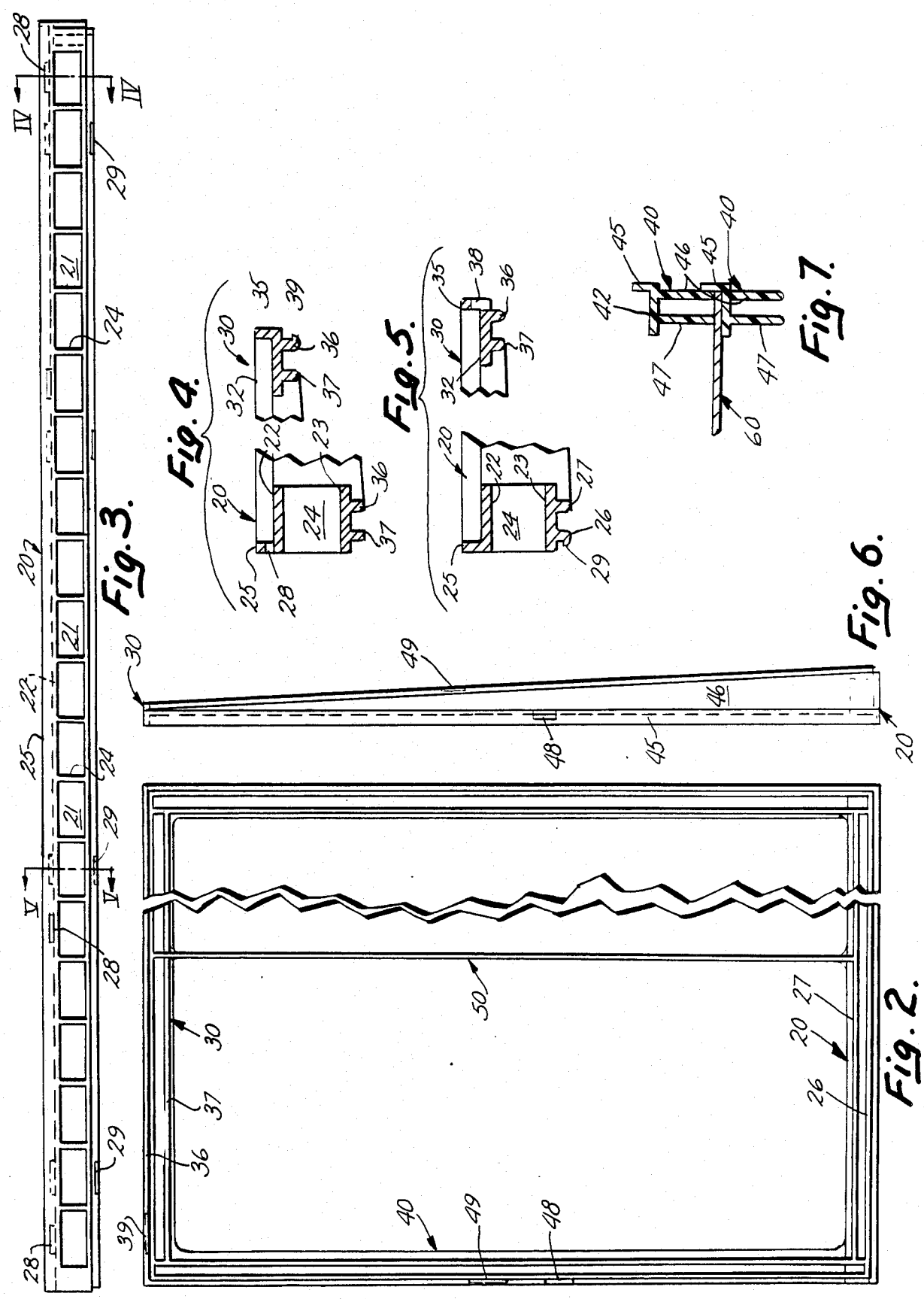

ered.

FILTER STACK

BACKGROUND OF THE INVENTION

The present invention relates to filter stacks. Filter stacks are used in many different types of air purifying equipment, from large commercial air purifiers for industry, to small compact room air conditioners.

A filter stack comprises a plurality of frames, each having openings along one edge, clamped together with a filter element between adjacent frames. The frames are alternately arranged with the openings in one frame opening in a first direction and the openings in the alternate frames opening in the opposite direction. In this way, air is drawn through one set of openings in the first set of frames, through the filter elements and then out through the openings in the second set of frames.

The small openings in the edges of the frames do cause restricted air flow. If one makes the frames wider, one can increase the size of the edge openings. However, one increases the volume of the stack with the same number of filter elements, thus decreasing the filter effectiveness per unit of volume.

Keeping the filter stack together so as to prevent air from leaking between adjacent frames is also difficult. Some artisans clamp the frames together with long bolts which extend completely through all of the frames of the stack. There is a tendency for the frames to bow apart in areas not directly adjacent the clamping bolts.

Another problem is that the filter elements can become misaligned between adjacent frames. This causes small gaps around the edges of the filter which can allow air to leak through the system without being filtered.

SUMMARY OF THE INVENTION

In the present invention, the problem of restricted air flow is eliminated by providing frames having a first wide edge with apertures therein, an opposite narrower edge with no apertures and joining edges which taper as they proceed from the large edge to the narrow edge. These frames are arranged with the wide edge of a first frame located adjacent the narrow edge of the adjacent frame. The filter media clamped between adjacent frames is thus inclined on an angle. Air can thus be drawn through the wide openings in the wide edge of the first frame, through the filter paper and then exhausted through the wide openings in the wide edge of the second frame. In this manner, air flow through the system is increased without sacrificing filter efficiency per unit of filter volume.

In a separate aspect of the invention, the individual frames are held together by a band of material which is as wide as the length of the tapered side edges of the filter frames and which extends continuously around the sides of the stack defined by the sides of the tapered joining edges of the frames and the open faces of the two frames at each end of the stack. The openings in the opposite first and second edges of the frames are thus not covered by the peripheral band of material.

In a third aspect of the invention, the problem of misaligned filter elements is eliminated by providing each frame with a parallel tongue arrangement which seats inside a lip on the next adjacent frame. The parallel tongues are spaced apart so that the inside tongue will engage the surface of the filter element at all points on the tongue, even though the filter element might be shifted to one side so that a portion of the outside tongue would not engage it.

These and other objects, advantages and features of the invention will be more fully understood and appreciated by reference to the written specification and appended drawings.

BRIEF DESCRIPTION OF THE DRAWINGS

FIG. 2 is a plan view of an individual frame with a portion broken away;

FIG. 3 is a side elevation of the wide edge of a frame;

FIG. 4 is a broken, cross sectional view taken along plane IV—IV of FIG. 3;

FIG. 5 is a broken, cross sectional view taken along plane V—V of FIG. 3;

FIG. 6 is an end elevational view of an individual frame; and

FIG. 7 is a fragmentary cross sectional view of two adjacent frame elements taken along plane VII—VII of FIG. 1.

DESCRIPTION OF THE PREFERRED EMBODIMENT

Figure 1:
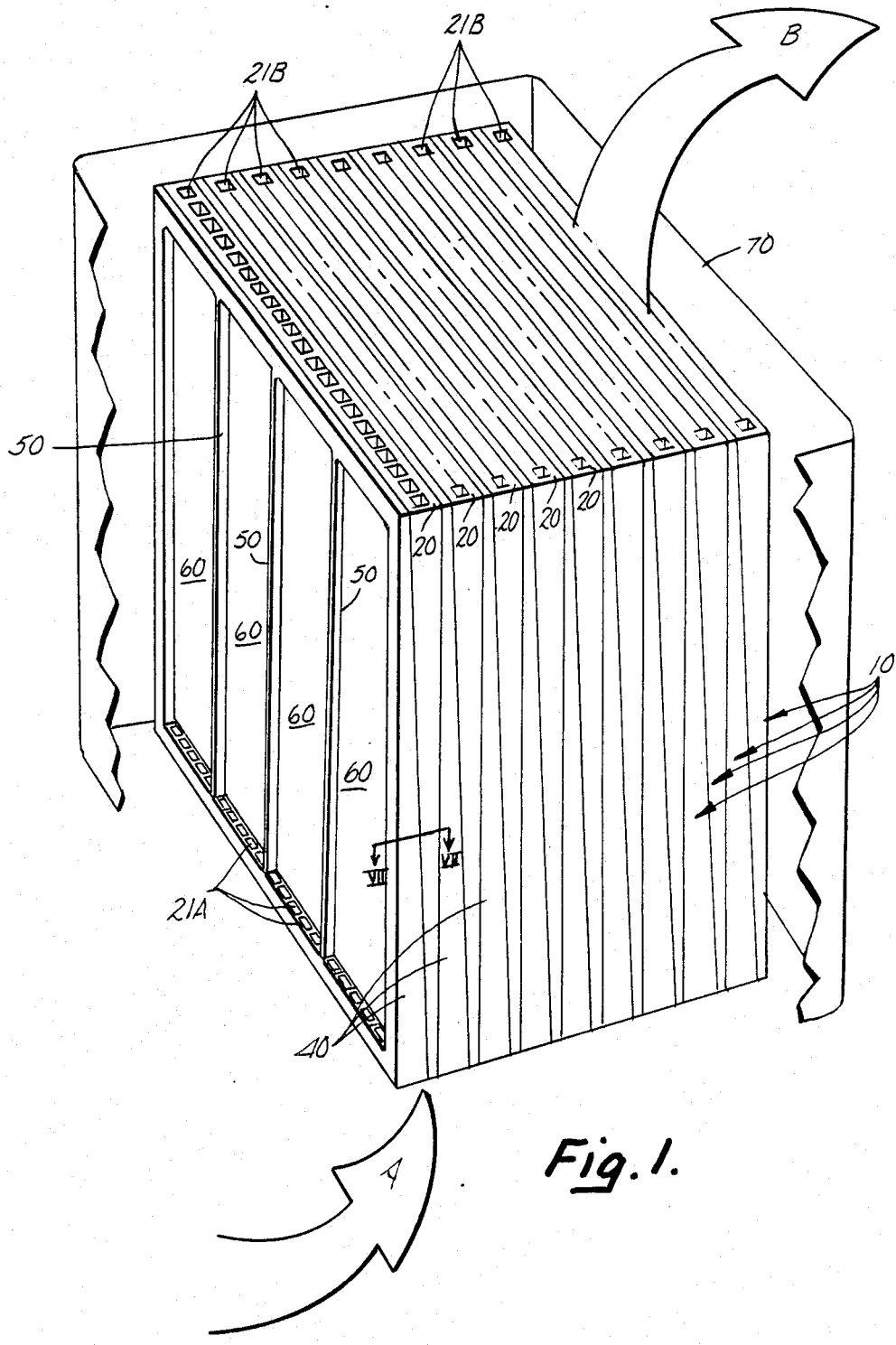
FIG. 1 is a perspective view of a filter stack in accordance with the present invention with the band of wrap material which holds the stack together being exploded away from the stack and with a portion of the band being broken away.

In the preferred embodiment, the filter stack 1 of the present invention comprises a plurality of alternatively oriented tapered frames 10, having filter paper 60 sandwiched between adjacent frames, and being held together by wrap 70, shown broken and exploded away from stack 1 in FIG. 1. Air is drawn through filter stack 1 along the path indicated by arrows A, B, such that it enters the openings 21A on one side of filter stack 1 and exits through openings 21B on the other side thereof. In order to follow that path, air must of course be drawn through each piece of filter paper 60 located between adjacent frames 10.

Each frame 10 is preferably molded of plastic and comprises a wide, opened side 20, an opposite narrow, closed side 30, both being joined by lateral sides 40 and several joining struts 50 (FIGS. 1 and 2). Open side 20 comprises a plurality of openings 21 defined by top rail 22, bottom rail 23 and a plurality of spaced ribs 24 joining said top and bottom rails (FIGS. 3, 4 and 5). In FIG. 1, the openings oriented to be inlet openings are labeled 21A and those oriented to be outlet openings are 21B. Wide side 20 is preferably approximately ¾ of an inch wide. Openings 21 are approximately ⅜ by ¾.

Projecting upwardly from the outside edge of upper rail 22 is a retaining lip 25 (FIGS. 3, 4 and 5). A similar retainer lip 35 is located on side 30, and similar retainer lips 45 are located on sides 40. Thus, a continuous retainer lip 25, 45, 35, 45 extends all the way around the perimeter of one surface of frame 10. Projecting downwardly from bottom rail 23 are locator tongue 26 and clamping tongue 27 (FIGS. 4 and 5). Locator tongue 26 is spaced just inwardly from the outside perimeter of bottom rail 23 a distance approximately equal to the thickness of retainer lip 35 on side 30, preferably ⅛ of an inch. When adjacent frames 10 are stacked together, locator tongue 26 fits just inside and generally against the inside surface of retainer lip 35. Locator tongue 26 is shorter than retainer lip 35 by a distance approximately equal to, but slightly less than the approximate thickness of filter paper 60. Thus when one frame 10 is seated on another, locator lip 26 not only serves to locate one frame inside the other, but also to clamp filter paper 60 in place without tearing or rupturing same.

Clamping tongue 27 is approximately the same size as locator tongue 26 and is spaced approximately ¼ of an inch further towards the inside edge of bottom rail 23. The purpose of clamping tongue 27 is to hold filter paper 60 in place, especially if, due to dimensional tolerances, the edge of a piece of filter paper 60 is located inwardly of locator lip 26. In this way, one can be assured that filter paper 60 will be positively held in place, even though its dimensions might vary somewhat.

Closed side 30 is similar in construction to open side 20, except that it does not include any openings (FIGS. 2, 4 and 5). Since there are no openings in closed side 30, there is only a single rail 32 having retainer lip 35 projecting upwardly therefrom and a locator tongue 36 and clamping tongue 37 projecting downwardly therefrom. These serve the same function as the corresponding retainer lip 25, locator tongue 26 and clamping tongue 27 on open rail 20. Locator tongue 26 on one frame fits snugly inside retainer lip 35. Locator tongue 36 similarly fits snugly inside retainer lip 25 on the next adjacent frame 10.

Open side 20 and closed side 30 are joined by a pair of ends or lateral sides 40 (FIGS. 2, 6 and 7). Each lateral side 40 is tapered from its juncture with wide side 20 downwardly to a narrow end at its juncture with narrow side 30 (FIG. 6). In cross section, each side 40 is similar to closed side 30. Each side 40 comprises a rail 42, a retainer lip 45 projecting upwardly therefrom, a locator tongue 46 projecting downwardly therefrom and a clamping tongue 47 projecting downwardly therefrom at a point spaced inwardly from locator tongue 46 (FIG. 7). The relative locations of retainer lip 45, locator tongue 46 and clamping tongue 47 are the same as those described above for retainer lips 25 and 35, locator tongues 26 and 36 and clamping tongues 27 and 37. The respective locator tongues 46 and clamping tongues 47 for each lateral side rail 40 are of course tapered in dimensions from a wide end of approximately 9/16 of an inch to a narrow end of approximately 1/16 of an inch.

There are three struts 50 joining open side 20 to closed side 30 intermediate lateral sides 40. (One is shown in FIG. 2, the rest having been broken away.) Each strut 50 is tapered and is dimensionally comparable to locator and clamping tongues 46 and 47 on lateral sides 40, except that each strut 50 is slightly wider by a distance approximately equal to the thickness of rail 42 of side 40. As a result, filter paper 60 sandwiched between adjacent frames 10 is clamped snugly between aligned struts 50.

A system of slots and tabs are provided to insure that frames 10 will be stacked together in an alternately tapered fashion as illustrated in FIG. 1. In closed side 20, there are four slots 28 in retaining lip 25 (FIGS. 3 and 4). These are in direct alignment with a small protruding tab 39 which projects laterally outwardly from the top edge of locator tongue 36 on closed side 30 (FIGS. 2 and 4). When frames 10 are properly stacked, tab 39 of one frame snap-fits into slot 28 of the next adjacent frame.

Similarly, open side 20 of each frame 10 includes four tabs 29 projecting laterally outwardly at spaced points from the top edge of locator tongue 26 (FIGS. 3 and 5). Tabs 29 are in direct alignment with open slots 38 in the upper retainer lip 35 of closed side 30 (FIG. 5). When properly arranged, the tab 29 on one frame 10 will snap-fit into the slot 38 on the next adjacent frame 10. The slots 28, 38 and tabs 29, 39 in the respective sides 20 and 30 are arranged in offset pairs, the offset distance being the same for each pair set. In this way, it is not possible to stack two frames 10 together with their open sides 20 facing in the same direction, since a tab 29 will not align with a slot 28. Rather, the frames must be reversed so that tabs 29 will snap into slots 38 and tabs 39 will snap into slots 28.

Lateral sides 40 include similar, offset slot and tab pairs 48 and 49 (FIGS. 2 and 6). Tabs 49 project laterally from the top edges of locator tongues 46. Slots 48 are located in retainer lip 45. When adjacent frames 10 are properly oriented, a tab 49 will snap-fit into a slot 48 in the next adjacent frame. When frames 10 are not properly oriented, the respective tabs and slots 49, 48 will not align.

Filter media 60 can be of any air filtering material. Typically, HEPA filter media will be utilized.

The frames 10 in a filter stack 1 are held snugly together by a wrap 70 extending circumferentially therearound. Wrap 70 wraps around lateral sides 40 and across struts 50 at the opposite ends of the stack. Wrap 70 is preferably approximately as wide as the length of lateral sides 40. Preferably, a shrink-wrap material is used as wrap 70. It is shrunk around stack 1 so that frames 10 are snugly held together at all points along the length of lateral sides 40, as well as open and closed sides 20 and 30.

In use, filter stack 1 is placed in a filtering apparatus, such as a room air treatment system or the like. Some type of fan draws or blows air through filter stack 1 from A to B (FIG. 1). Air flows inwardly through the openings 21A in the open sides 20 which are oriented towards side A (FIG. 1). The air then must flow through the various layers of filter median 60 in order to flow outwardly through openings 21B in the open sides 20 which are oriented towards side B.

Because of the taper of frames 10, and their alternate arrangements, air flow through filter stack 1 is maximized without sacrificing effective filtering area per volume of filter stack. Filter paper 60 is positively held in place at all points, at least by clamping tongues 27, 37 and 47, and at most points by locator tongues 26, 36 and 46. Paper 60 will also be clamped in place between adjacent struts 50.

The entire stack 1 is held firmly together at all points throughout its width by shrink-wrap 70. Shrink-wrap 70 also seals the sides of stack 1 and insures that no air will leak through the system without passing through filter paper 60.

Of course, it is understood that the above is merely a preferred embodiment of the invention and that various changes and alterations can be made without departing from the spirit and broader aspects thereof.

The embodiments of the invention in which an exclusive property or privilege is claimed are defined as follows:

1. A filter stack comprising:
   a plurality of frames with a filter medium located between adjacent frames, each frame having opposed first and second sides, there being openings in said frame first sides, said frames being arranged alternatively such that the first side on one frame faces a first direction and the first side on the next adjacent frame faces in the opposite direction, the improvement comprising:

each of said first sides being wider than each of said second sides, said first and second sides being joined by lateral sides which are tapered from a wide end adjacent said first side to a narrower end adjacent said second side whereby said frames are arranged in a stack with said first sides of some of said frames facing a first direction and the first sides of the alternate frames facing in the opposite direction so that air can flow through said openings in said first sides facing in said first direction, through said filter medium between adjacent frames and out said openings in said first sides facing in said opposite direction to thereby maximize the flow of air through said filter stack.

2. The apparatus of claim 1 in which each of said frames includes a pair of spaced, parallel tongues extending laterally from said first, second and lateral sides of said frame towards the next adjacent frame in said stack, said tongues being located towards the perimeter of each said frame, with one tongue being spaced inwardly from said perimeter farther than the other whereby said filter medium will be held in place between adjacent frames through engagement with said tongues and whereby at least said one tongue will engage said filter medium at all points on said one tongue, even though dimensional tolerances in said filter medium might result in some portions of said other tongue not engaging said filter medium.

3. The apparatus of claim 2 in which each of said frames includes a lip projecting laterally from said first, second and lateral sides in a direction towards the next adjacent frame, said lip projecting from that surface of said frame which is opposite the direction from which said tongues project; said lip being located generally at the perimeter of said frame, said other tongue and said lip being located with respect to each other such that the other tongue on one frame fits snugly just inside said lip on the next adjacent frame.

4. The apparatus of claim 3 in which each of said tongues is shorter in height than said lip by a distance just less than the median thickness of said filter medium whereby when said lip on one frame is seated against the next adjacent frame, the filter medium between adjacent frames will be securely held in position between said tongues and the next adjacent frame but will not be compressed to the point of damage or breakage by reason of its engagement by said tongues.

5. The apparatus of claim 4 which includes at least one strut extending between said first and second sides of each of said frames, said strut having a width which is less than the thickness of said frame from one surface to the other by a distance approximately just less than the median thickness of said filter medium sandwiched between adjacent frames such that said filter medium will be held firmly in place between aligned struts, but will not be clamped so tightly as to be damaged thereby.

6. The apparatus of claim 5 in which each of said frames includes at least one tab and one slot offset from said one tab located on one side of said frame, and a second such slot and a second such tab located on the opposite side of said frame and being offset from one another by the same distance, said first tab being in alignment with said second slot and said second tab being in alignment with said first slot whereby as any two adjacent frames are arranged with their first sides oriented in opposite directions, said first tab on one frame will matingly engage said second slot on the other frame and said second tab on said other frame will matingly engage said first slot on said one frame, but whereby said slots and tabs will not engage if said frames are improperly oriented with said first sides of adjacent frames facing the same direction.

7. The apparatus of claim 6 in which said stack is firmly held together by a wrap extending around said stack so as to embrace the lateral sides of said frames, but so as not to embrace and cover said first and second sides of said frames, said wrap having approximately the same width as the length of said lateral sides whereby said stack is firmly held together with a relatively even pressure over the entire width of said stack.

8. The apparatus of claim 7 in which said wrap comprises a band of shrink-wrap material, shrunk-wrapped around said stack.

9. The apparatus of claim 1 in which each of said frames includes at least one tab and one slot offset from said one tab located on one side of said frame, and a second such slot and a second such tab located on the opposite side of said frame and being offset from one another by the same distance, said first tab being in alignment with said second slot and said second tab being in alignment with said first slot whereby as any two adjacent frames are arranged with their first sides oriented in opposite directions, said first tab on one frame will matingly engage said second slot on the other frame and said second tab on said other frame will matingly engage said first slot on said one frame, but whereby said slots and tabs will not engage if said frames are improperly oriented with said first sides of adjacent frames facing the same direction.

10. The apparatus of claim 1 in which said stack is firmly held together by a wrap extending around said stack so as to embrace the lateral sides of said frames, but so as not to embrace and cover said first and second sides of said frames, said wrap having approximately the same width as the length of said lateral sides whereby said stack is firmly held together with a relatively even pressure over the entire width of said stack.

11. The apparatus of claim 10 in which said wrap comprises a band of shrink-wrap material, shrink-wrapped around said stack.

12. A filter stack comprising:
a plurality of frames with a filter medium located between adjacent frames, each frame having opposed first and second sides and lateral sides joining said first and second sides, there being openings in said frame first sides, said frames being arranged alternatively such that the first side on one frame faces a first direction and the first side on the next adjacent frame faces in the opposite direction, the improvement comprising:
each of said frames including a pair of spaced, parallel tongues extending laterally from said first, second and lateral sides of said frame towards the next adjacent frame in said stack, said tongues being located towards the perimeter of each said frame, with one tongue being spaced inwardly from said perimeter farther than the other whereby said filter medium will be held in place between adjacent frames through engagement with said tongues and whereby at least said one tongue will engage said filter medium at all points on said one tongue, even though dimensional tolerances in said filter medium might result in some portions of said other tongue not engaging said filter medium.

13. The apparatus of claim 12 in which each of said frames includes a lip projecting laterally from said first, second and lateral sides in a direction towards the next adjacent frame, said lip projecting from that surface of said frame which is opposite the direction from which said tongues project; said lip being located generally at the perimeter of said frame, said other tongue and said lip being located with respect to each other such that the other tongue on one frame fits snugly just inside said lip on the next adjacent frame.

14. The apparatus of claim 13 in which each of said tongues is shorter in height than said lip by a distance just less than the median thickness of said filter medium whereby when said lip on one frame is seated against the next adjacent frame, the filter medium between adjacent frames will be securely held in position between said tongues and the next adjacent frame but will not be compressed to the point of damage or breakage by reason of its engagement by said tongues.

15. The apparatus of claim 14 which includes at least one strut extending between said first and second sides of each of said frames, said strut having a width which is less than the thickness of said frame from one surface to the other by a distance approximately just less than the median thickness of said filter medium sandwiched between adjacent frames such that said filter medium will be held firmly in place between aligned struts, but will not be clamped so tightly as to be damaged thereby.

16. The apparatus of claim 15 in which each of said frames includes at least one tab and one slot offset from said one tab located on one side of said frame, and a second such slot and a second such tab located on the opposite side of said frame and being offset from one another by the same distance, said first tab being in alignment with said second slot and said second tab being in alignment with said first slot whereby as any two adjacent frames are arranged with their first sides oriented in opposite directions, said first tab on one frame will matingly engage said second slot on the other frame and said second tab on said other frame will matingly engage said first slot on said one frame, but whereby said slots and tabs will not engage if said frames are improperly oriented with said first sides of adjacent frames facing the same direction.

17. The apparatus of claim 16 in which said stack is firmly held together by a wrap extending around said stack so as to embrace the lateral sides of said frames, but so as not to embrace and cover said first and second sides of said frames, said wrap having approximately the same width as the length of said lateral sides whereby said stack is firmly held together with a relatively even pressure over the entire width of said stack.

18. The apparatus of claim 17 in which said wrap comprises a band of shrink-wrap material, shrunk-wrapped around said stack.

19. The apparatus of claim 12 in which each of said frames includes at least one tab and one slot offset from said one tab located on one side of said frame, and a second such slot and a second such tab located on the opposite side of said frame and being offset from one another by the same distance, said first tab being in alignment with said second slot and said second tab being in alignment with said first slot whereby as any two adjacent frames are arranged with their first sides oriented in opposite directions, said first tab on one frame will matingly engage said second slot on the other frame and said second tab on said other frame will matingly engage said first slot on said one frame, but whereby said slots and tabs will not engage if said frames are improperly oriented with said first sides of adjacent frames facing the same direction.

20. The apparatus of claim 12 in which said stack is firmly held together by a wrap extending around said stack so as to embrace the lateral sides of said frames, but so as not to embrace and cover said first and second sides of said frames, said wrap having approximately the same width as the length of said lateral sides whereby said stack is firmly held together with a relatively even pressure over the entire width of said stack.

21. The apparatus of claim 20 in which said wrap comprises a band of shrink-wrap material, shrunk-wrapped around said stack.

22. A filter stack comprising:
a plurality of frames with a filter medium located between adjacent frames, each frame having opposed first and second sides and lateral sides joining said first and second sides, there being openings in said frame first sides, said frames being arranged alternatively such that the first side on one frame faces a first direction and the first side on the next adjacent frame faces in the opposite direction, the improvement comprising:
said stack being firmly held together by a wrap extending around said stack so as to embrace the lateral sides of said frames, but so as not to embrace and cover said first and second sides of said frames, said wrap having approximately the same width as the length of said lateral sides whereby said stack is firmly held together with a relatively even pressure over the entire width of said stack.

23. The apparatus of claim 22 in which said wrap comprises a band of shrink-wrap material, shrunk-wrapped around said stack.

24. The apparatus of claim 23 in which each of said frames includes at least one tab and one slot offset from said one tab located on one side of said frame, and a second such slot and a second such tab located on the opposite side of said frame and being offset from one another by the same distance, said first tab being in alignment with said second slot and said second tab being in alignment with said first slot whereby as any two adjacent frames are arranged with their first sides oriented in opposite directions, said first tab on one frame will matingly engage said second slot on the other frame and said second tab on said other frame will matingly engage said first slot on said one frame, but whereby said slots and tabs will not engage if said frames are improperly oriented with said first sides of adjacent frames facing the same direction.

25. The apparatus of claim 22 in which each of said frames includes at least one tab and one slot offset from said one tab located on one side of said frame, and a second such slot and a second such tab located on the opposite side of said frame and being offset from one another by the same distance, said first tab being in alignment with said second slot and said second tab being in alignment with said first slot whereby as any two adjacent frames are arranged with their first sides oriented in opposite directions, said first tab on one frame will matingly engage said second slot on the other frame and said second tab on said other frame will matingly engage said first slot on said one frame, but whereby said slots and tabs will not engage if said frames are improperly oriented with said first sides of adjacent frames facing the same direction.

* * * * *